United States Patent [19]

Hilsum et al.

[11] 3,947,842
[45] Mar. 30, 1976

[54] ELECTRO-OPTIC MATRIX-TYPE DISPLAY PANEL INCORPORATING OPTOELECTRONIC ADDRESSING SWITCHES

[75] Inventors: Cyril Hilsum; Adrian Leonard Mears, both of Malvern, England

[73] Assignee: Secretary of State for Defence in Her Britannic Majesty's Government of the United Kingdom of Great Britain and Northern Ireland, London, England

[22] Filed: May 20, 1974

[21] Appl. No.: 471,825

[30] Foreign Application Priority Data
May 23, 1973 United Kingdom............... 24566/73

[52] U.S. Cl. ........................ 340/324 R; 250/213 A
[51] Int. Cl.² .......................................... G06F 3/14
[58] Field of Search ........... 340/365, 324 R, 324 M, 340/166 EL; 250/213 A, 220 M, 213 R

[56] References Cited
UNITED STATES PATENTS

| | | | |
|---|---|---|---|
| 3,673,579 | 6/1972 | Graven | 340/324 A |
| 3,812,486 | 5/1974 | Purchase | 340/324 M |
| 3,825,922 | 7/1974 | Ralph | 340/324 M |

Primary Examiner—Marshall M. Curtis
Attorney, Agent, or Firm—Stevens, Davis, Miller & Mosher

[57] ABSTRACT

An electro-optic display system comprises a plurality of display elements each capable of producing an optical display signal in response to electrical operating energy, a separate channel to each of said display elements, each of said channels incorporating a photosensitive element for the purpose of opening the channel in which that photosensitive element is incorporated for a given period to enable electrical operating energy to be applied during the given period via that channel to an appropriate one of said display elements, a generator of electromagnetic radiation signals arranged to irradiate in response to electrical control signals selected ones of said photosensitive elements and a generator of electrical control signals arranged to feed electrical control signals to said generator of electromagnetic radiation signals. The display elements may be arranged in a straight line which may be one row or column of a matrix array of the elements. The photosensitive elements may be photoconductors or photovoltaic elements and they may be part of a single patch formed as an integrated structure with the display elements on a common substrate. The display elements may for example be electroluminescent elements or liquid crystal elements. The first mentioned generator may be a plurality of semiconductor light-emitting diodes.

9 Claims, 3 Drawing Figures

ELECTRO-OPTIC MATRIX-TYPE DISPLAY PANEL INCORPORATING OPTOELECTRONIC ADDRESSING SWITCHES

BACKGROUND TO THE INVENTION

The present invention relates generally to electro-optic display systems and particularly to addressing such systems.

For many years the conversion of information from an electrical form into an optical form has been carried out using displays based upon vacuum tube devices such as the cathode ray tube. Such displays have proved to be very convenient and reliable in many applications. However some modern applications require displays having an adaptable shape and size which can be operated using relatively low voltages and low power and which can be manufactured relatively cheaply; as a result of these requirements much interest in the display field has been diverted from conventional displays based upon vacuum tube devices towards other kinds of display such as those based upon solid state devices and upon liquid crystals.

These other kinds of display have produced problems not previously encountered with conventional displays. One such problem is that of addressing the displays, i.e., feeding them with electrical information to convert into an optical form. Displays not using conventional vacuum tube devices consist typically of an array of display elements each of which can be addressed individually. Addressing the elements typically involves activating drive circuits with electrical control signals fed from logic circuits. The drive circuits act as electrical switches; when activated they gate electrical energising signals from an electrical source to the appropriate display element to energise those elements.

In certain cases these drive circuits cannot be made in integrated electronic circuit form because conventional integrated circuits do not have the appropriate voltage or power handling capability. As a result they have to be assembled from discrete electronic components, and their assembly is considerably time-consuming.

It is therefore an object of the invention to make the drive circuits in an integrated form so that they may be fabricated together in large numbers but in such a form that they have a reasonably high voltage or power handling capability if required.

BRIEF SUMMARY OF THE INVENTION

According to the present invention an electro-optic display system includes a plurality of display elements each capable of producing an optical display signal in response to electrical operating energy, a separate channel to each of the said display elements, each of the said channels incorporating a photosensitive element for the purpose of opening the channel in which that photosensitive element is incorporated during the given period via that channel to an appropriate display element, a generator of electromagnetic radiation signals arranged to irradiate in response to electrical control signals selected ones of the said photosensitive elements and a second generator of electrical control signals arranged to feed electrical control signals to the generator of electromagnetic radiation signals.

The plurality of display elements is conveniently arranged in a line. In that case the line may be one row in a row and column matrix array of display elements; each channel may be common to all of the display elements in a given column.

The display elements may be either active, i.e. of the kind generating light; for instance they can be miniature plasma discharge elements or semiconductor or phosphor electroluminescent elements. Alternatively the display elements may be passive, i.e. of the kind modulating light; for instance they may be liquid crystal elements, electrochromic elements or electrophoretic elements.

The photosensitive elements may be photoconductors such as cadmium sulphide or cadmium selenide or photovoltaic elements and they may each be an integral part of a single patch (or strip) of photoconductor material. Preferably, the photosensitive elements and the array of display elements are formed integrally on a common substrate.

The generator of electromagnetic radiation signals may incorporate an array of light emitting elements, such as electroluminescent elements, or an array of light modulating elements such as liquid crystal elements.

The generator or electrical control signals may be arranged to irradiate the photosensitive elements via a plurality of fibre-optic radiation guides.

BRIEF SUMMARY OF THE DRAWINGS

Embodiments of the present invention will be described by way of example with reference to the accompanying drawings, in which.

DESCRIPTION OF THE PREFERRED EMBODIMENTS

Figure 1:
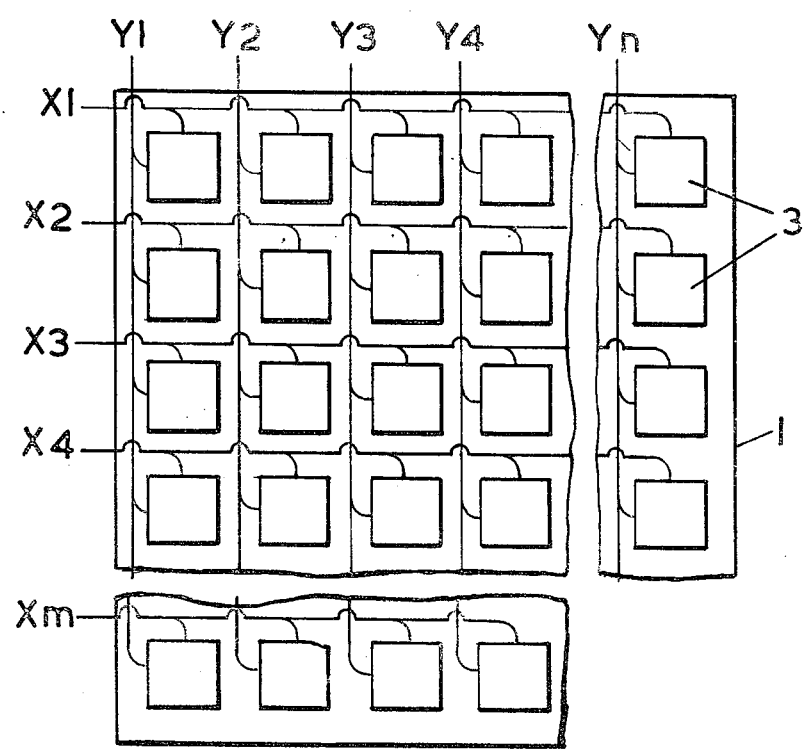
FIG. 1 is a schematic representation of a known display panel.

FIG. 1 is a schematic representation of a known display panel. The panel, denoted by the reference numeral 1, contains a matrix of display elements 3. Conductors X1, X2, X3, X4 ... Xm, collectively referred to herein as X conductors, are respectively connected to all of the elements 3 in the first, second, third, fourth ... mth rows of the matrix. Conductors Y1, Y2, Y3, Y4 ... Yn, collectively referred to herein as Y conductors, are respectively connected to all of the elements 3 in the first, second, third, fourth ... nth columns of the matrix. The elements 3 may for instance be electroluminescent phosphor elements, such as elements which are responsive to unidirectional operating voltages, for instance those made from zinc sulphide doped with manganese and copper. Electroluminescent phosphor panels made in such a way are described in copending United Kingdom Patent application Nos. 54853/72 and 8707/73. The elements 3 may also be, for instance, electrochemicl-luminescent elements, (so called) light-emitting diodes, i.e., semiconductor p-n junctions which emit light when forward biased, miniature plasma discharge elements, liquid crystal elements, electrochromic elements or electrophoretic elements. If they are liquid crystal elements, electrochromic elements or electrophoretic elements they are used to modulate light generated from a separate source (not shown).

When appropriate voltages are applied between selected X conductors and Y conductors the elements 3 at the intersections of those conductors are operated, i.e., are caused to emit light or modulate light as appropriate, to give a display. Alphanumeric characters can conveniently be displayed by operating selected groups of the elements 3 together.

One known way of applying the operating voltages is to apply an electrical potential pulse of one polarity to the conductor X1 whilst applying an electrical potential pulse of the opposite polarity to selected Y conductors, then to apply an electrical potential pulse of the first polarity to the conductor X2 whilst applying an electrical potential pulse of the opposite polarity to further selected Y conductors, and so on.

The two kinds of pulses, i.e., of opposite polarities, have magnitudes such that they are not capable of causing significant operation of the elements 3 alone but are so capable when combined together. The elements 3 may each incorporate a non-linear electrical resistor, or latch, for this purpose.

If the voltages are applied in the way described then in order to apply electrical potential pulses to the selected Y conductors two particular addressing functions have to be carried out. The first of these functions is to select the appropriate Y conductors to which an electrical potential pulse must be applied contemporaneously with the pulse applied to each separate X conductor. The second function is to generate an electrical potential pulse and to gate it to the appropriate Y conductors selected as a result of the first function. In general two distinct units are required to carry out the two functions. Typically, in known systems, the unit for carrying out the first function is an arrangement of integrated circuit logic elements and the unit for carrying out the second function is a source of electrical energy and an arrangement of electronic switches for periodically connecting the source to the appropriate Y conductors, the electronic switches being controlled by the output signals from the logic elements.

Normally integrated circuit logic elements handle only low voltage (about 4 to 5 volts) signals. In comparison, electronic switches which are used to address electroluminescent phosphor panels have to handle voltages up to about 100 volts. As a result, these electronic switches have to be made from discrete electronic components, and their assembly is considerably time consuming and hence relatively expensive when a large number are involved.

In accordance with an embodiment of the present invention the electronic switches used in the prior art are replaced by optoelectronic switches. Each optoelectronic switch includes a photosensitive element, such as a photoconductor, for periodically connecting the source of electrical potential to a separate Y conductor, and a photoelectric element for generating in response to a control signal from the logic elements an optical signal capable of periodically converting the photosensitive element into the state in which it connects the source of electrical energy and the appropriate Y conductor.

Figure 2:
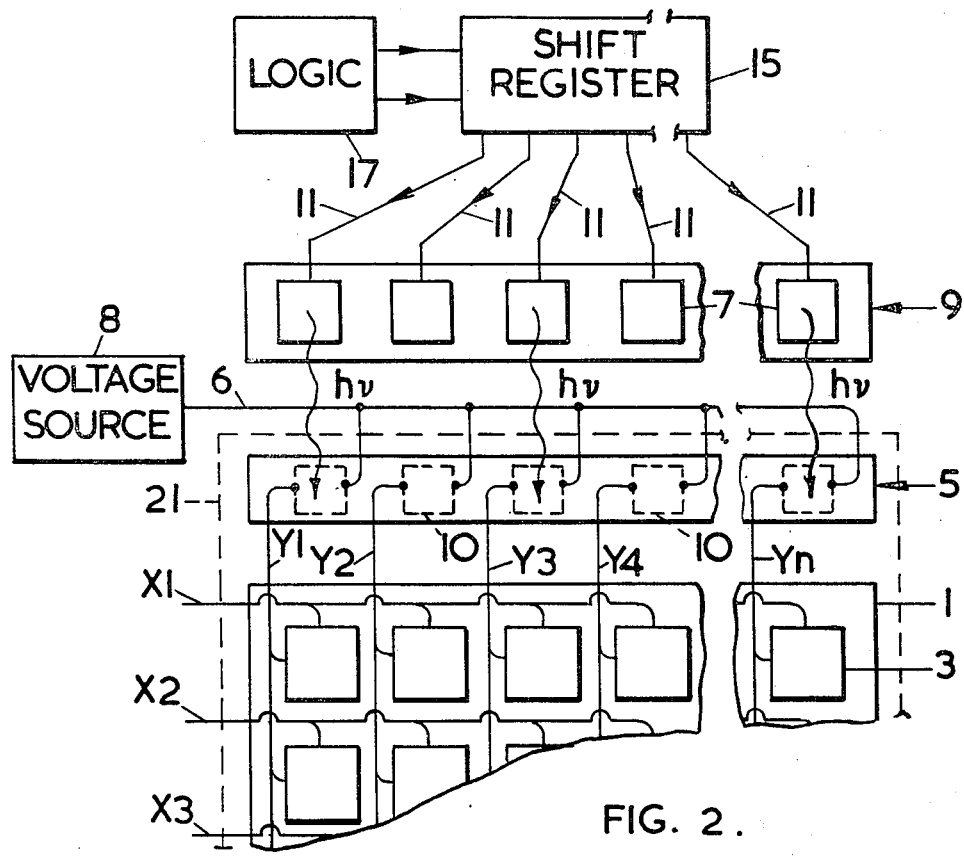
FIG. 2 is a schematic representation of a display system embodying the present invention.

FIG. 2 is a schematic representation of a display system embodying the present invention. The system incorporates the known display panel 1 described with reference to FIG. 1 and a series of optoelectronic addressing switches. A patch (strip) 5 of photoconductor material such as cadmium sulphide or selenide is located adjacent to one end of the panel so as to make contact with all of the Y conductors of the panel 1. The patch 5 and the panel 1 may (if appropriate) both be formed on a single substrate indicated by reference numeral 21.

The patch 5 may be considered as having a row of discrete channels 10 each attached individually to a corresponding Y conductor. Alternatively the patch 5 may be scribed or etched to produce the channels 10 in a physically isolated form. A conductor 6 is attached to all of the channels 10. When optical radiation of sufficient intensity is incident on any one of the channels 10 a conductive bridge is formed between the conductor 6 and the appropriate Y conductor through that channel 10. The intensity of the optical radiation depends on the particular panel 1 and the switching speed required but the intensity is typically 1,000 ft Lamberts for a rapidly switched electroluminescent phosphor panel. The conductor 6 is connected to a voltage source 8. An optical signal generator module 9 has a row of optical signal generatng elements 7 which can each be operated selectively, i.e., when required, to produce an individual pulse of fixed intensity optical radiation. For the purpose of illustration, three such pulses are denoted in FIG. 2 by wavy lines and the symbol h$\nu$. Each individual pulse of optical radiation is incident on an appropriate individual channel 10 of the patch 5 of photoconductor material. A conventional optical guide plate (not shown) incorporating a series of fibre-optic radiation guides can be used to direct the pulses of radiation from the selected elements 7 to the appropriate channels 10. The module 9 is not in general coplanar with the patch 5 (or substrate 21). Conveniently, the module 9 is arranged so that the pulses of radiation are incident on the patch 5 in a direction perpendicular to the plane of the patch 5.

The module 9 is conveniently operated using electrical signals supplied from conventional logic 17 via a shift register 15. The outputs of the various stages of the shift register 15 are applied individually to the elements 7 of the module 9 by conductors 11.

In operation, the logic 17 supplies a series of electrical pulses which appear to be randomly spaced to the shift register 15. The apparent randomness of the spacing represents the selection of elements 3 in any given row in the panel 1 to which elements 3 an operating voltage pulse is to be applied via the appropriate Y conductors. Therefore the series of pulses from the logic 17 constitutes a series of '0' (no pulse) and '1' (pulse) digits applied to the shift register 15. When all the pulses in the series have been applied to the shift register 15 selected stages of the shift register are in the '1' state and unselected stages are in the '0' state. An output command pulse is then applied to the shift register 15 from the logic 17. This causes the selected stages of the shift register 15 to emit a voltage pulse (typically 4 to 5 volts). This voltage pulse is transferred via the appropriate conductors 11 to the appropriate elements 7 and causes those elements 7 to emit a pulse of optical radiation. Each pulse of optical radiation is incident on the appropriate one of the channels 10 causing conductive bridge to form through that channel 10 and between the conductor 6 and the appropriate Y conductor. The conductive bridge lasts for the period during which optical radiation is emitted from the appropriate one of the elements 7, which period is the duration of the output pulses from the shift register 15, plus the period required for the photoconductor material of the patch 5 to relax back into its high resistance state. Each conductive bridge allows the voltage developed by the voltage source 8 to be applied separately to the selected Y conductors. The voltage developed by the voltage source 8 and applied to the selected Y conductors may be steady, pulsed or alternating according to the kind of display panel 1 used.

When the panel 1 is continuously operated a significant voltage can be built up across unselected elements 3, particularly when the panel 1 consists of an array of liquid crystal elements, which have a relatively high resistance. This occurs when a fraction of the full operating voltage is repeatedly applied across those unselected elements 3. To avoid this problem the elements 3 may all be discharged at some suitable time, for example after all the elements 3 in a given row or all the elements 3 in the panel 1 have been addressed, by applying an optical radiation pulse to all of the channels 10 to make them conducting for a short period. Alternatively, the problem may be avoided if conductivity through the channels 10 is suitably non-ohmic, eg if the channels 10 have a much higher resistance for a voltage of one polarity than for a voltage of the opposite polarity or have a much higher resistance for a high voltage than for a low voltage. One way of achieving a non-ohmic characteristic is described below.

The module 9 may be a row of elements of any known kind which are responsive to voltages of about 4 to 5 volts (the output from the logic 17 and the shift register 15). It may for instance be a row of liquid crystal optical modulating elements, together with a source (not shown) of fixed intensity optical radiation continuously irradiating them; or a row of (so called) light-emitting diodes preferably formed from a III-V compound or alloy system, such as gallium arsenide, gallium arsenide phosphide or indium gallium phosphide; or a thin film electroluminescent phosphor panel such as a panel made from II-VI material doped appropriately with a conducting material such as copper and an activating agent such as manganese, together with voltage amplifying means to make the module 9 in that case responsive to the pulses from the shift reister 15. If the module 9 is required to emit high intensity radiation, light-emitting diodes fabricated in a known way in the form of semiconductor lasers may be used.

The module 9 does not necessarily have to be addressed using the shift register 15. It can be addressed using any known means which is suitable.

The photoconductor material of the patch 5 is preferably cadmium sulphide or cadmium selenide, although it can be any material which has a high ratio of light conductivity to dark conductivity and which is suitable for use with the particular module 9 used.

Figure 3:
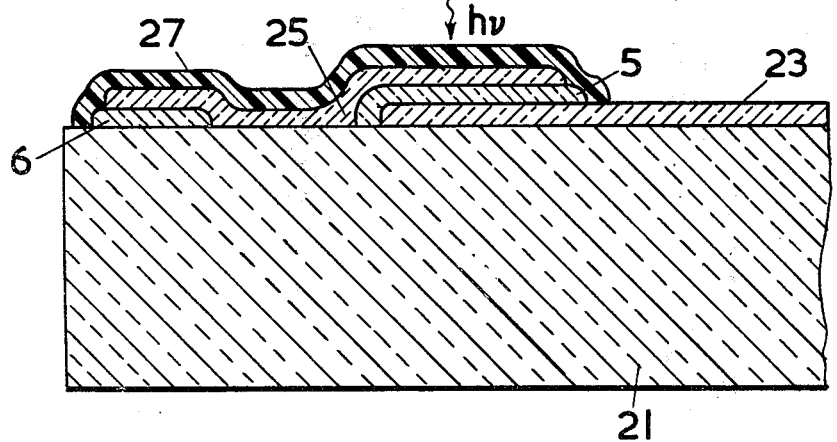
FIG. 3 is a cross-sectional diagram illustrating a physical construction of part of the system illustrated in FIG. 2.

FIG. 3 is a cross-sectional diagram illustrating one form of physical construction of part of the system described with reference to FIG. 2. The panel 1 (not shown in FIG. 3) is fabricated on one part of a glass block constituting the substrate 21. Each Y conductor leading from the panel 1 is in the form of a strip 23 (one shown) of conducting material, such as tin oxide, running across the surface of the block 1. The patch 5 of photoconductor material is deposited in a known way, such as by r.f. sputtering, across the surface of the block 1 and over the ends of each of the strips 23. The conductor 6 is deposited in a known way in the form of a strip of opaque material such as gold running across the surface of the block 1 parallel to the patch 5. A separate layer 25 (one shown) of transparent conducting material is deposited in a known way over the patch 5 at each place where the patch 5 overlies one of the strips 23. Each of the layers 2 extends over a discrete part of the conductor 6. A layer 27 of silica, which is optically transparent, is deposited in a known way over the conductor 6, the patch 5 and each layer 25 for the purpose of encapsulation. A fibreoptic guide plate (not shown) may be attached or located across the surface of the finished structure on top of the patch 5, so that the fibre-optic guides optically connect individual elements 7 (FIG. 2) and channels 10.

The module 9 (not shown in FIG. 3) is arranged so that pulse of optical radiation from its elements 7 are incident on each channel 10 of the patch 5 in a direction perpendicular to the plane of the patch 5. The conductor 6 is opaque so that the layers 25, which can act as optical radiation guides, are optically isolated from one another.

In another embodiment of the invention the part of each strip 23 in contact with the patch 5 is coated with a metal, such as gold, to provide a Schottky barrier. If selected strips 23 are biased negatively to produce operation of appropriate elements 3 the conductivity through the various channels 10 of the patch 5 is then significantly non-ohmic, i.e. has a rectifying characteristic.

In another embodiment of the invention the strips 23 and the layers 25 may be mutually arranged to form the digits of an interdigital comb structure.

In another embodiment of the invention the X conductors of the panel 1 described with reference to FIG. 1 can be optoelectronically addressed in the same way as that used for addressing the Y conductors.

We claim:

1. An electro-optic display system comprising a panel incorporating a matrix of rows and columns of display elements each capable of producing an optical display signal in response to electrical operating energy, a series of row addressing conductors electrically connected to those of said display elements in each row of said matrix, a series of column addressing conductors electrically connected to those of said display elements in each column of said matrix, a separate channel to each separate addressing conductor belonging to one of said series of addressing conductors, each of said channels comprising a photosensitive element for the purpose of opening the channel in which that photosensitive element is incorporated for a given period to enable electrical operating energy to be applied during the given period via the channel to an appropriate one of said addressing conductors, a generator of electromagnetic radiation signals arranged to irradiate in response to electrical control signals selected ones of said photosensitive elements and a generator of electrical control signals arranged to feed electrical control signals to said generator of electromagnetic radiation signals, wherein said photosensitive elements are defined by a linear structure of photosensitive material deposited on said panel adjacent but distinct from said matrix of display elements and wherein a conductor structure for connecting said photosensitive elements to a source of electrical operating energy is deposited on said panel symmetrically with respect to said linear structure.

2. A display system as claimed in claim 1 wherein said linear structure of photosensitive elements comprises a strip of photoconductive material deposited adjacent an edge of said matrix parallel to said row addressing conductors and wherein said conductor structure comprises a strip of conductive material deposited adjacent and parallel to said strip and a plurality of individual connections from said strip to individual photosensitive elements in said strip.

3. A display system as claimed in claim 1 wherein said generator of electromagnetic radiation signals comprises a row of elements each capable of producing an optical radiation signal in response to output voltages from integrated circuit logic and wherein said generator of electrical control signals comprises integrated circuit logic connected directly to said generator of electromagnetic radiation signals.

4. A display system as claimed in claim 3 wherein said logic is such as to operate said generator of electromagnetic radiation signals in a selective manner whereby some of said elements of said generator of electromagnetic radiation signals are selected for operation by said logic while others are not selected, said selected elements being operated together.

5. A system as claimed in claim 1 wherein said generator of electromagnetic radiation signals comprises a row of semiconductor light-emitting diodes.

6. A system as claimed in claim 5 wherein said diodes are semiconductor lasers.

7. A system as claimed in claim 1 wherein said display elements are electroluminescent phosphor elements.

8. A system as claimed in claim 4 wherein said display elements are electroluminescent phosphor elements.

9. A system as claimed in claim 1 wherein said display elements are liquid crystal elements.

* * * * *